(12) United States Patent
Tiotantra et al.

(10) Patent No.: US 10,552,053 B2
(45) Date of Patent: Feb. 4, 2020

(54) HYBRID DATA STORAGE DEVICE WITH PERFORMANCE MODE DATA PATH

(71) Applicant: Seagate Technology LLC, Cupertino, CA (US)

(72) Inventors: Harry Tiotantra, Singapore (SG); Kai C. Chen, Singapore (SG); WenXiang Xie, Singapore (SG); Feng Shen, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/278,068

(22) Filed: Sep. 28, 2016

(65) Prior Publication Data

US 2018/0088833 A1    Mar. 29, 2018

(51) Int. Cl.
*G06F 3/06* (2006.01)

(52) U.S. Cl.
CPC ............ *G06F 3/0613* (2013.01); *G06F 3/068* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 7,716,411 B2 | 5/2010 | Panabaker et al. | |
| 7,861,038 B2 | 12/2010 | Fontenot et al. | |
| 8,639,872 B1 | 1/2014 | Boyle et al. | |
| 8,661,194 B2 | 2/2014 | Nam | |
| 8,670,205 B1* | 3/2014 | Malina | G06F 3/0625 360/69 |
| 8,959,281 B1* | 2/2015 | Malina | G06F 12/0246 711/103 |
| 9,009,393 B1 | 4/2015 | Sutardja | |
| 9,182,927 B2 | 11/2015 | Liu et al. | |
| 9,282,277 B2 | 3/2016 | Moon et al. | |
| 2008/0024899 A1* | 1/2008 | Chu | G06F 3/0614 360/69 |
| 2009/0172454 A1* | 7/2009 | Takai | G06F 3/0625 713/340 |
| 2009/0204872 A1 | 8/2009 | Yu et al. | |
| 2010/0088459 A1 | 4/2010 | Arya et al. | |
| 2010/0262392 A1* | 10/2010 | Murphy | G06F 3/0625 702/63 |
| 2010/0318824 A1 | 12/2010 | Tinker | |

(Continued)

*Primary Examiner* — Edward J Dudek, Jr.
*Assistant Examiner* — Ralph A Verderamo, III
(74) *Attorney, Agent, or Firm* — Hall Estill Attorneys at Law

(57) ABSTRACT

Apparatus and method for managing data in a hybrid data storage device. In some embodiments, a hybrid data storage device operates in a normal mode in which data transfer commands received from a host device are serviced by a top level controller circuit which directs a first subset of the received data transfer commands to a non-volatile rotatable recording memory and a second subset of the received data transfer commands are directed to a non-volatile solid-state memory. The controller circuit transitions to a performance mode responsive to a detected first parameter so that subsequently received data transfer commands are directed exclusively to the solid-state memory. The controller circuit terminates the performance mode and resumes the normal mode responsive to a detected second parameter.

20 Claims, 7 Drawing Sheets

(56) References Cited

U.S. PATENT DOCUMENTS

| | | |
|---|---|---|
| 2011/0179219 A1 | 7/2011 | Ma et al. |
| 2012/0275046 A1 | 11/2012 | Ehrlich |
| 2013/0086307 A1* | 4/2013 | Kurashige ............ G06F 12/0866 711/103 |
| 2014/0207996 A1 | 7/2014 | Fisher et al. |
| 2014/0233132 A1 | 8/2014 | Budiman et al. |
| 2015/0248247 A1 | 9/2015 | Andrews et al. |
| 2015/0277764 A1* | 10/2015 | Ehrlich ................. G06F 3/0616 711/103 |
| 2017/0371588 A1* | 12/2017 | Shaharabany .......... G06F 3/068 |

* cited by examiner

HYBRID DATA STORAGE DEVICE WITH PERFORMANCE MODE DATA PATH

SUMMARY

Various embodiments of the present disclosure are generally directed to a hybrid data storage device that utilizes different operational modes to enhance data transfer rates.

In some embodiments, a method operates a hybrid data storage device in a normal mode in which data transfer commands received from a host device are serviced by a top level controller circuit which directs a first subset of the received data transfer commands to a non-volatile rotatable recording memory and a second subset of the received data transfer commands are directed to a non-volatile solid-state memory. The controller circuit transitions to a performance mode responsive to a detected first parameter so that subsequently received data transfer commands are directed exclusively to the solid-state memory. The controller circuit terminates the performance mode and resumes the normal mode responsive to a detected second parameter.

In other embodiments, a hybrid data storage device has a non-volatile rotatable recording memory, a non-volatile solid-state memory and a top level controller circuit. The controller circuit operates in a normal mode and a performance mode. During the normal mode, the controller circuit directs a first subset of data transfer commands received from a host device to the non-volatile rotatable recording memory and a second subset of the received data transfer commands to a non-volatile solid-state memory. During the performance mode, the controller circuit directs data transfer commands received from the host device to the non-volatile solid-state memory. The controller circuit transitions from the normal mode to the performance mode responsive to a detected first parameter. The controller circuit subsequently transitions from the performance mode back to the normal mode responsive to a detected second parameter.

These and other features and aspects of various embodiments of the present disclosure can be understood upon a review of the following detailed description in conjunction with the associated drawings.

DETAILED DESCRIPTION

Figure 1:
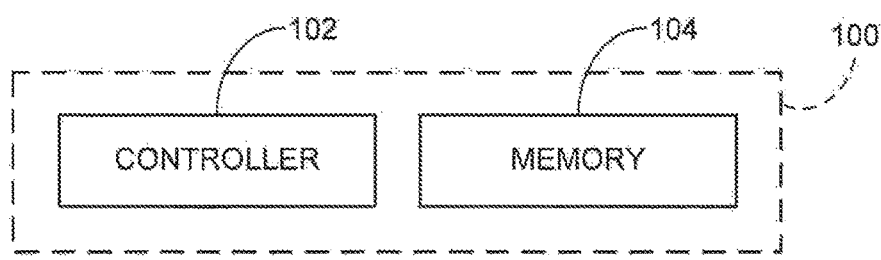
FIG. 1 is a block diagram for a data storage device characterized as a hybrid storage device in accordance with various embodiments.

The present disclosure generally relates to data storage systems, and more particularly to the management of data transfers using a hybrid data storage device.

Data storage devices operate to store and retrieve computerized user data in a fast and efficient manner. Data storage devices can utilize a variety of different types of storage media, including rotatable recording discs of the type commonly used in hard disc drives (HDDs) and solid state semiconductor memory of the type commonly used in solid state drives (SSDs).

So-called hybrid data storage devices utilize two or more distinct forms of non-volatile storage media to store user data. Some forms of hybrid data storage devices (HDSDs, also sometimes referred to as solid state hybrid drives, or SSHDs) utilize a main memory formed from rotatable magnetic recording media (e.g., magnetic discs) and a smaller auxiliary memory formed from solid state (e.g., flash) memory cells. Both forms of storage media provide a combined non-volatile storage space to store user data transferred to the device from a host.

Hybrid devices are designed to combine the benefits of low cost mass storage afforded by rotatable magnetic recording media with the faster transfer rate performance provided by solid state memory (e.g., flash). It is common to operate a hybrid device in such a way that high priority data tend to be stored in the solid state memory since such memory tends to provide fester data transfer rates as compared to the relatively slower rotatable media. Ideally, hybrid devices should provide faster overall transfer rate performance that conventional HDDs and should be significantly less expensive than SSDs. The ratio of solid state memory to rotatable storage in a hybrid device can vary, but usually the amount of storage capacity provided by the solid state memory is on the order of about 1-2% of the size of the rotatable media. Other relative values and ratios can be used as desired.

While hybrid devices have been found operable in providing enhancements in the overall data transfer capacity of a storage device as compared to an HDD, there are a number of limitations that have been found to be unique to hybrid devices that are not easily resolved. It is well established that current generation SSDs can sustain significant data transfer rates, such as on the order of 400 megabytes (MB, $10^9$ bytes) per second (MB/s) or more. Depending on a number of factors, rotatable disc HDDs can sustain data transfer rates that are perhaps 10-15% of an SSD.

It might be expected that hybrid drives would provide significantly better transfer rate performance than HDDs due to the inclusion of the solid state memory which, if properly managed, should result in significant increases in the overall data rate for the device. After all, the solid state memory in a hybrid device will tend to have native transfer rates consonant with those of SSDs, and the most active data sets will be maintained in the solid state memory of the hybrid device. Conventional wisdom would further suggest that increasing the ratio of the solid state memory in a hybrid device, such as to 20-25% or more of the native disc/capacity, would tend to further enhance the overall data transfer rate of the hybrid device. In practice, this has not generally been the case.

One limitation associated with hybrid devices is that, as noted above, the faster solid state memory only constitutes a small proportion of the overall total storage capacity of the device. Thus, unlike an SSD where all data stored by the device will be resident in the solid state memory, only a small portion of the available data will be stored in the solid state memory in a hybrid device, and this data will change over time. There is accordingly a large processing overhead required to identify, track and manage the data stored in the solid state memory. Increasing the size of the solid state memory would increase this overhead processing burden and could potentially result in a slower overall transfer rate.

Another unique property associated with most hybrid devices is that all data sets received by a hybrid device will usually also be stored by the rotatable media. Even if data are initially stored in the flash memory, a backup copy will be written to disc using a process sometimes referred to as data cleaning. In a similar fashion, sometimes data sets initially stored to the disc media will be migrated, or promoted, to the flash (so called "data pinning"). Data cleaning and pinning operations are usually carried out in the background during normal device operation, and can significantly add to the overall command loading of the device.

There is accordingly a need for improvements in the art for enhancing data transfer characteristics of a hybrid data storage device. To this end, various embodiments disclosed herein provide a method and apparatus for enacting different operational modes. A normal mode of operation generally invokes the use of a main data path in the device to store data to two (or more) forms of non-volatile storage media in a hybrid data storage device, such as rotatable data recording media (e.g., magnetic recording discs) and solid-state memory (e.g., flash memory).

A performance mode of opinion is enacted from time to time to transition the hybrid data storage device to the use of a high performance data path. Generally, during high performance processing, all data writes and most data reads are carried out exclusively using the faster form of non-volatile memory (e.g., the flash memory, apart from read commands to access data stored only in the slower form of non-volatile memory (e.g., the rotating discs).

A number of different mechanisms can be used to enact and terminate the performance mode. Write intensive environments and read/write exchanges involving hot data are some examples. Other parameters that may be used to switch to performance mode can include observed data transfer rates, bit error rates (BER) for transferred data, locations of stored data associated with pending host access commands, observed environmental sensor measurements such as temperature, operational shock and vibration, etc. A first parameter may be used to initiate performance mode processing and a different, second parameter may be used to subsequently terminate performance mode processing.

The more that the incoming commands can rely on the faster memory (e.g., flash) and less on the slower memory (e.g., disc), the closer the overall data transfer rate will approach the native data transfer performance of the faster memory. Performance enhancements are also gained when a single top level controller is managing both command queues for the respective faster and slower memory, since the controller can direct substantially all access commands to the faster memory queue. In some cases, offloaded "normal mode" processing commands, such as disc access reads that cannot be serviced by the flash, can be accumulated and performed in a batch mode while maintaining the system in performance mode. Similarly, data cleaning and pinning commands can be accumulated and either executed during or after the performance mode.

These and other features and advantages of various embodiments can be understood beginning with a review of FIG. 1 which shows an exemplary data storage device 100. The data storage device 100 includes a controller 102 and a memory 104. The controller 102 is a control circuit that provides top level control functionality for the storage device, and may be realized in hardware, software and/or firmware. The controller circuit may constitute one or more programmable processors having associated programming instructions stored in a memory which, when executed, cause the processor(s) to carry out various control functions as explained herein. Other forms of controller circuit can be utilized, such as hardware circuits, programmable gate arrays, logic networks, application specific integrated circuits (ASICs), system on chip (SOC) devices, etc. As will be recognized, these and other forms of controller circuits may be formed of various logic, storage and switching elements using semiconductor fabrication techniques.

The memory 104 provides non-volatile memory storage for user data transferred to the storage device by a host device. The memory may incorporate a number of different types of non-volatile storage such as solid-state memory (e.g., flash), rotatable storage media, etc. For purposes of the present illustrative example, the device 100 is contemplated as comprising a hybrid data storage device (HDSD or SSHD) so that the memory 104 includes both rotatable storage media and solid state semiconductor memory. While not limiting, the rotatable media are contemplated as magnetic recording media and the solid state memory is contemplated as flash memory. Other arrangements can be used.

Figure 2:
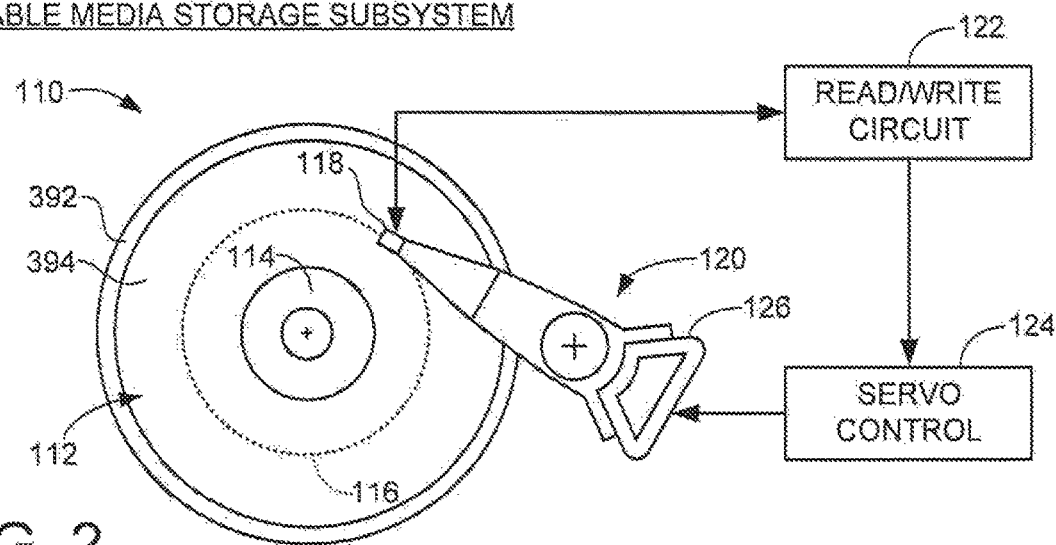
FIG. 2 is an isometric depiction of a rotatable media storage subsystem of the hybrid storage device of FIG. 1 constructed and operated in accordance with some embodiments.

FIG. 2 shows a rotatable media storage subsystem 110 of the memory 104 of FIG. 1 in accordance with some embodiments. The subsystem 110, also sometimes variously referred to as rotatable media, the disc, the disc section, etc., constitutes aspects of a hard disc drive (HDD) storage system. Various other elements may be incorporated into the subsystem so the diagram is illustrative and not limiting.

The disc section 110 includes one or more rotatable magnetic recording discs 112 that are fixed for rotation about a central axis of a spindle motor 114. A number of concentric tracks 116 are arranged on each of the disc surfaces and are accessed by a corresponding data read/write transducer (head) 118.

The heads 118 are moved across the surfaces of the discs using a rotary actuator 120. A read/write (R/W) channel circuit 122 provides write currents to and receives transduced readback signals from each head during respective write and read operations. A servo control circuit 124 provides closed loop positional control of the position of the heads 118 using embedded servo data (not separately shown) from the disc surfaces. The servo circuit 124 applies current to a coil 126 of a voice coil motor (VCM) to adjust the position of a selected head accordingly.

Figure 3:
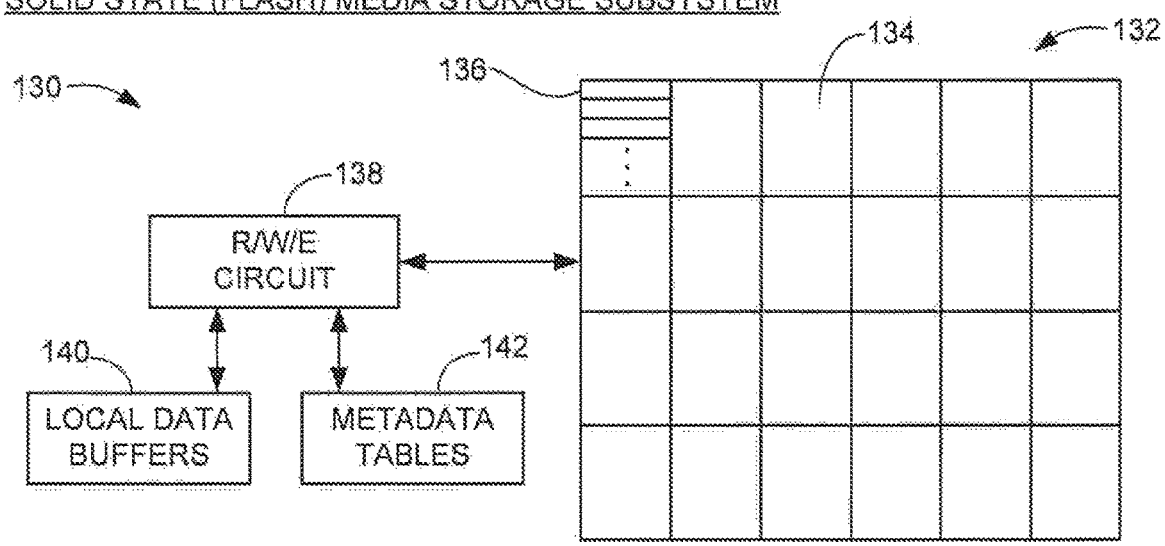
FIG. 3 is an isometric depiction of a solid state (flash) media storage subsystem of the hybrid storage device of FIG. 1 constructed and operated in accordance with some embodiments.

FIG. 3 shows a solid state media storage subsystem 130 of the memory 104 of FIG. 1 in accordance with some embodiments. The subsystem 130 is also sometimes referred to as solid state media, the flash, the flash section, etc., and is generally arranged as aspects of a solid state drive (SSD) storage system. Various other elements may be incorporated into the subsystem so the diagram is illustrative and not limiting.

The solid state media 130 includes a flash array 132 of flash memory cells arranged into rows and columns. The flash cells are grouped into erasure blocks 134, each constituting a smallest section of the flash array that can be erased as a unit. Each erasure block 134 is formed from individual pages (row) 136 of memory cells to which fixed sized blocks of data may be written. Multiple erasure blocks 134 may be grouped into larger garbage collection units (GCUs) that are allocated and erased as a unit.

A read/write/erase (R/W/E) circuit 138 directs data transfers to and from the respective pages 136, and performs data migrations and erasures during garbage collection operations. A number of local data buffers 140 in the form of volatile memory serve to temporarily buffer data during such activities. Local volatile memory 142 can further be used to load, store and utilize metadata to track the locations and revision levels of various data sets stored in the array 132. While flash memory is contemplated for the subsystem 130, other forms of non-volatile semiconductor memory cells can be used such as RRAM, STRAM, PCRAM MRAM, etc.

Figure 4:
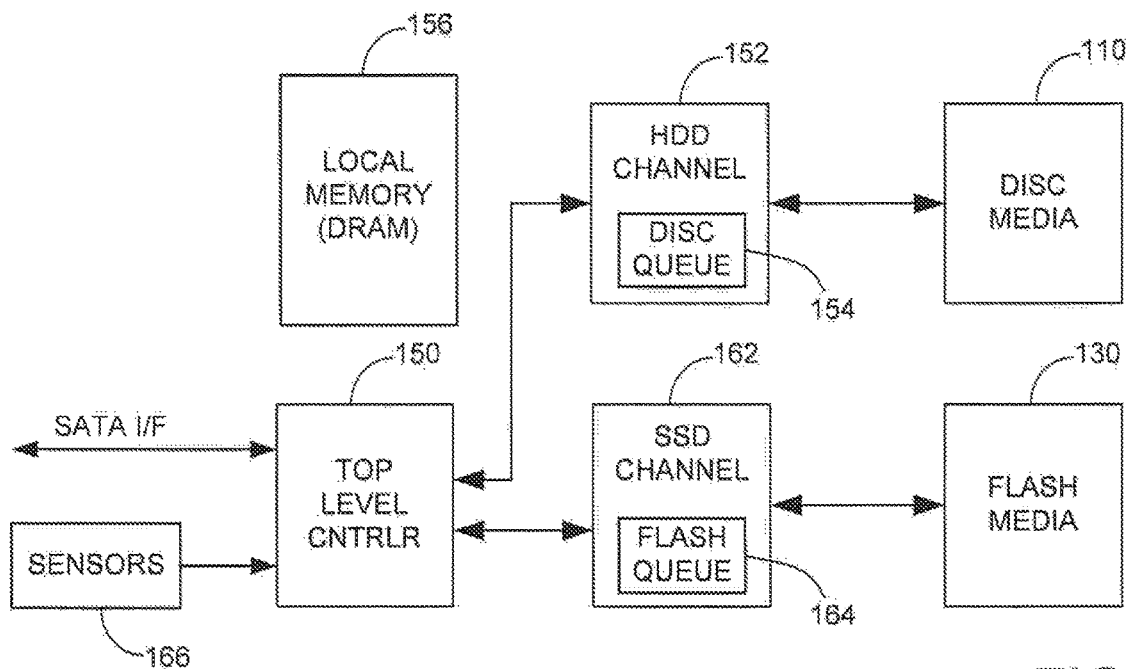
FIG. 4 shows an arrangement of the controller circuitry from FIG. 1 in accordance with some embodiments.

FIG. 4 provides a simplified top level architecture for the device 100 in accordance with some embodiments. Communication with the host device is carried out using a suitable interface protocol, such as the SATA I/F protocol. Other configurations can be used.

A top level controller 150 directs host access operations (e.g., read and write commands) to the respective disc media 110 and the flash media 130 using separate channel circuitry as shown. More particularly, an HDD channel circuit 152 includes a disc access command queue 154 to manage data transfers between the discs 112 and a local memory (e.g., DRAM) 156. An SSD channel circuit 162 includes a flash access command queue 164 to similarly manage data transfers between the flash array 132 and the DRAM 156.

The channels 152, 162 can include separate controller circuits as required to provide local management of the respective memories 112, 132. The local memory 156 may be partitioned to provide separate SSD and HDD subsections to store data associated with these respective forms of memory.

One or more environmental sensors 166 can be used to provide environmental inputs for use by the top level controller. Such sensors can take a variety of forms to provide measurements of temperature, altitude, operational vibration (e.g., translational and rotational vibration, mechanical shock events), etc.

Figure 5:
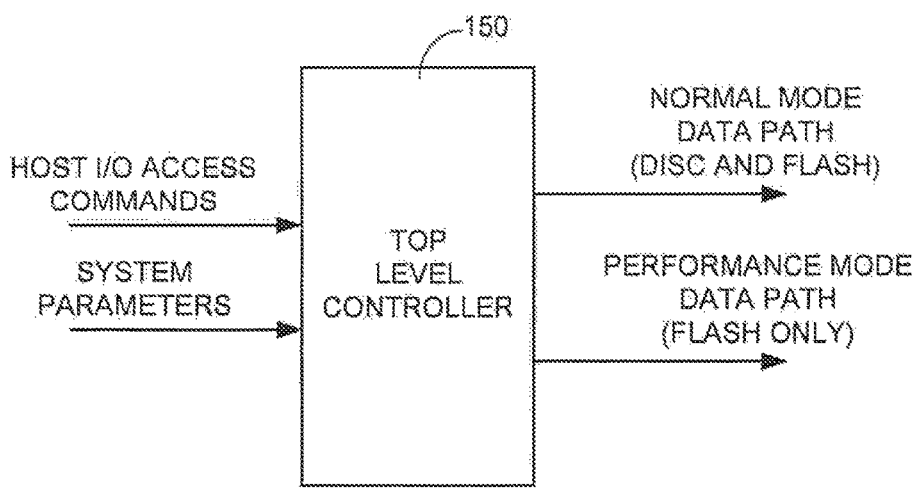
FIG. 5 shows an arrangement of the top level controller circuit of FIG. 4.

FIG. 5 shows the top level controller circuit 150 from FIG. 4 configured to switch between two main operational modes; a normal mode and a performance mode. The normal mode utilizes a main data path through the device used to transfer data to the respective disc and flash memory. The performance mode uses a differently configured path through the device to perform data transfers exclusively with the flash memory.

As noted above, the performance of a data storage device is largely a function of how quickly the device can complete the servicing of host access commands. While a number of techniques can be utilized to optimize a given device response, physical aspects of the device construction remain a limiting factor.

For example, a data storage device (e.g., HDD) with magnetic recording media that rotate at nominally 5,400 revolutions per minute (rpm) would generally add about 10 milliseconds, ms of average rotational latency overhead to each command completion time. In systems that include techniques such as buffer cache, access pattern detection, deep queuing, etc., the average command overhead may be reduced to around 6 ms. Faster disc rotational speeds may further reduce this command overhead, but in rotatable media of the current generation, such overhead will usually average out to be at least a few milliseconds.

Because of this built in latency, implementation decisions at the controller level can be carried out that involve hundreds or even thousands of microseconds (μs) of processor time to select an optimum command sequence strategy. Adding a flash memory or other non-volatile solid state memory to an existing HDD architecture allows the existing disc based architecture to function with the existing disc-based latencies while adding additional functionality to direct, as required, storage activities with the flash memory. However, this is not optimum since the main data path is still based on the latencies associated with the rotatable memory. Higher density recording modes, such as shingled magnetic recording (SMR) where data tracks are written in partially overlapping bands, require even further processor overhead, limiting the availability to execute fast flash transfers.

Accordingly, various embodiments utilize a traditional HDD based hybrid main data path to service commands in a normal fashion for both forms of memory (e.g., disc and flash, etc.). However, a separate parallel performance mode data path is additionally implemented by the controller 150. The so-called performance mode of operation essentially ignores the existence of the rotatable media and streams all commands directly to the flash memory (or other form of faster memory).

As explained in greater detail below, performance mode can be detected and entered by using straightforward table data structures to determine if commands can be satisfied using the flash memory. Various parameters can be used to invoke performance mode as well. Once invoked, subsequent commands in the performance path reap the performance optimization of switching to the new mode.

In some embodiments, the performance mode is maintained as long as possible so that read and write operations are satisfied solely using the flash memory. Write commands result in write data being stored in flash. Read commands are satisfied directly from flash.

The occurrence of a read command that cannot be satisfied from flash or DRAM does not automatically result in the suspension or termination of performance mode; rather, such commands can be queued for efficient disc accesses. This further reduces that portion of the controller circuit dedicated to managing the disc queue, which may lead to further operational efficiencies.

In some cases, a host generated command may be used to terminate performance mode. Such commands may include resets, releases of requested cache space or other logical or physical resources that require the main path to be used. In other cases, monitoring by the device of access patterns or environmental factors may result in the device transitioning back to normal mode.

Figure 6:
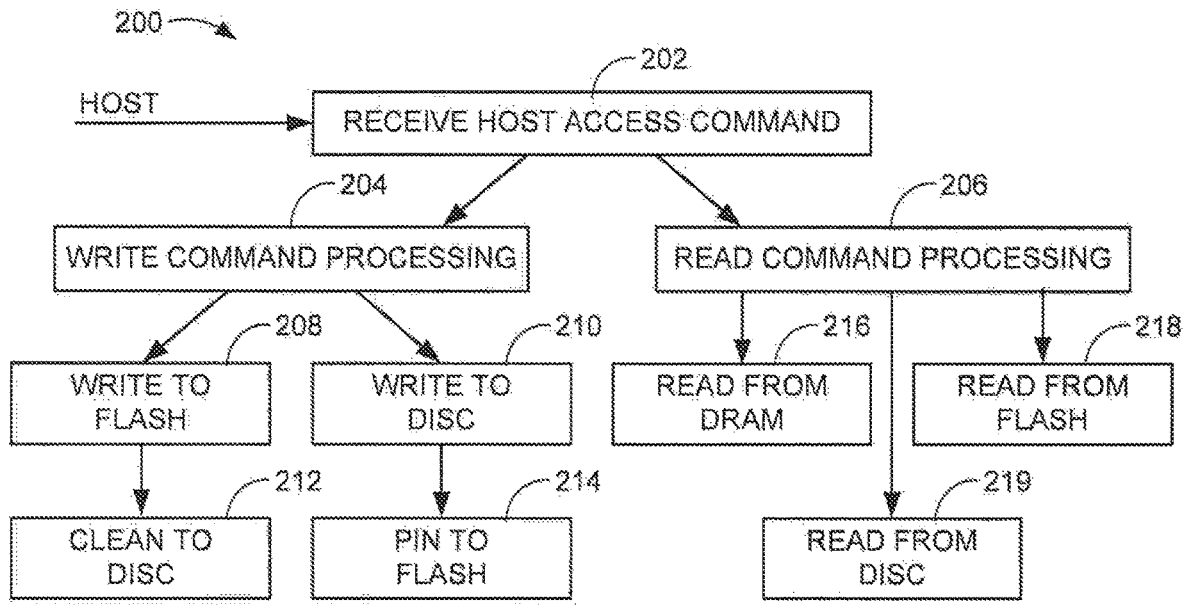
FIG. 6 illustrates a decision tree to provide an overview of various internal data transfers that take place by the storage device under the direction of the top level controller circuit of FIG. 5 during normal mode processing in accordance with some embodiments.

FIG. 6 provides a decision tree structure 200 to illustrate various steps that may be carried out during normal mode (main path) processing. The structure denotes decisions carried out by the top level controller 150 of FIG. 5 in managing various internal data transfers within the hybrid data storage device 100. Initially, host access commands are received from the host device at block 202. Such commands are initially processed by the top level controller circuit 150, including determining whether the command is a write command or a read command. The respective formats of the commands will depend upon a number of factors including the interface protocol employed by the hybrid device (e.g., SAS, SATA, Ethernet etc.).

Each write command will include a host level logical address that uniquely identifies the data, along with a copy of the write data to be transferred to the hybrid storage device 100. Each read command will tend to include a similar host level logical address indicating the block or blocks of data that are requested to be forwarded to the host device.

Block 204 represents write command processing, and block 206 represents read command processing. Each kind of command is processed differently. Write command processing generally results in the writing of data either to the flash memory (block 208) or to the disc (block 210). The input write data associated with the write command are formatted and placed in the appropriate partition of the DRAM 156 (FIG. 4) pending encoding and transfer. In addition, as noted above all data sets initially written to the flash memory will be subsequently scheduled for a cleaning operation to copy the data to disc, block 212. At least some data sets identified as high priority data will additionally be migrated, via a copy operation, to place a copy into the flash via the pinning operation identified at block 214.

The respective cleaning and pinning operations involve internally generated read and write operations to read the data from one form of memory (disc or flash) and to write the readback data to the other form of memory (flash or disc). This will include an operation by the top level controller 150 to transfer the read back data from one partition to the other within the DRAM 156. Both cleaning and pinning may be carried out during ongoing servicing of pending host commands.

To perform a cleaning operation as set forth by block 212, a read command is internally generated by the top level controller 150 and forwarded to the SSD channel circuit 162 for inclusion in the flash queue 164. The requested data are retrieved from the flash memory 130 and the readback data are transferred to the local memory 156. The top level controller issues a write command to the HDD channel 152 for inclusion in the disc queue 154, and execution of the command results in the writing of the data to the disc media 110.

A pinning operation as set forth by block 214 is carried out in a similar fashion. The top level controller 150 provides a read command to the HDD channel 152. The data are returned to the local memory (DRAM 156), after which the controller 150 provides a write command to the SSD channel 162 for writing to the flash memory 130.

Read command processing in FIG. 6 involves the lop level controller 150 locating the data requested by the received read command. Provided the data have been resident in the data storage device long enough, a copy of all requested data will always generally be available from the disc memory 110. Faster access may be provided from the DRAM 156 or the flash memory 130, however, so part of the read command processing will include locating where the respective copy or copies of the requested data are located. In this way, the data may be retrieved as a cache hit from the DRAM (block 216), the flash memory (block 218) or the disc memory (block 219).

In some cases, the search involves a hierarchical strategy whereby the flash memory is cheeked first for the requested data; if so, the read command is forwarded to the flash memory section 130 for retrieval. If not in the flash, the DRAM 156 is checked to determine whether the data are resident locally, allowing a cache hit. If not resident in the DRAM, the top level controller 150 forwards the read command to the HDD channel circuit 152 for a retrieval operation from the disc media.

While the system can operate to check the DRAM first, it has been found more efficient to simply retrieve the requested data from the flash as required. This simplifies both the search strategy as well as reducing the complexity of read caching algorithms that may be used to retain read data in the DRAM in the hopes of obtaining a read cache hit. The speed with which data can be retrieved from the flash does not warrant the extra complexity in performing read caching management upon the SSD partition of the DRAM. On the other hand, due to the significant latencies that can be involved in returning data from the rotating media, read caching schemes are employed during normal mode processing, such as a least recently used (LRU) approach, to manage valid readback cache data in the DRAM from the disc.

Figure 7:
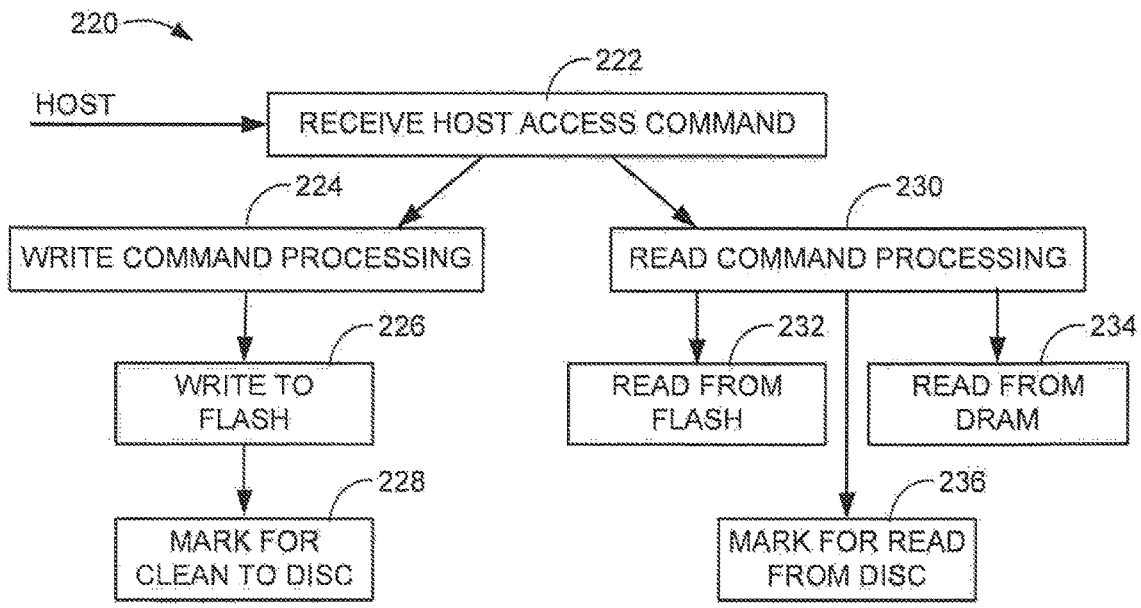
FIG. 7 illustrates a decision tree to provide an overview of various internal data transfers that take place by the storage device under the direction of the top level controller circuit of FIG. 5 during performance mode processing in accordance with some embodiments.

FIG. 7 shows performance mode processing in accordance with some embodiments. As noted above, performance mode uses the performance path so that all data accesses substantially involve the flash memory. As before, host access commands are received at block 222, and these are largely separated into read and write commands. Other commands such as status commands may be received during both normal and performance mode, but such are not germane to the present discussion and will not generally tend to cause a change from one mode to the other.

Write command processing is denoted at 224, which generally entails the immediate writing of the input write data to the flash memory, block 226. It is noted that all direct writes to flash will require a subsequent scheduling of a cleaning operation to write a copy to disc, as indicated at block 228. These can be held for a later time, but a suitable data structure can be updated at this time identifying the data that need to be cleaned.

Read processing is denoted at block 230. As before, the data may be resident in flash, DRAM and/or disc. Optimally, the data may be read from the flash memory, block 232, and this is the first check made by the system. If not present in the flash, a check is made to determine if the data are cached in the DRAM, block 234. In those cases where these checks are unsuccessful, the read command is marked as requiring disc access, block 236.

It will be noted that read commands generally have a different latency effect on the host as compared to write commands. Generally, most host operating systems are designed such that a command complete status is required before the host system will proceed with a next command. Some multi-layer approaches can be used so that some amount of pendency can be tolerated, but generally, the host requires confirmation that a given command has been completed before the host will proceed with another command.

A write command generally provides more flexibility to the data storage system, in that the data storage system can signal a completion of the write command before the data have actually been physically written to the target media location. A read command, however, generally requires the requested data to be presented to, or otherwise made available to, the requesting host before the host is satisfied and moves on. Thus, a pending read command will tend to cause some latency to the host so long as the requested data have not yet been returned.

Accordingly, the performance mode processing entails risks associated with the return of read data that are not resident in semiconductor memory (e.g., flash or DRAM). One solution is to maintain operation of the main data path processing capabilities of the system; after all, if substantially all access commands are being processed by the flash, this frees up resources used by the disc portion of the main data path. In some embodiments, those relatively few read commands that cannot be immediately satisfied by the DRAM or flash are directed to the HDD queue 154 (FIG. 4) for execution by the disc portion of the device. While normal latencies will be associated with these commands, the data can be obtained in a reasonable amount of time (e.g., average of about 6 ms, etc.), transferred to DRAM and made available to the host in a manner similar to normal mode processing.

Depending on whether the device 100 is operating in a read intensive or write intensive environment, the extent to which read commands are accumulated and forwarded to the HDD queue 154 may vary significantly. Recursive writes and reads can be largely satisfied by the flash, so the access patterns experienced by the device will largely determine the performance gains obtained by performance mode operation.

Figure 8:
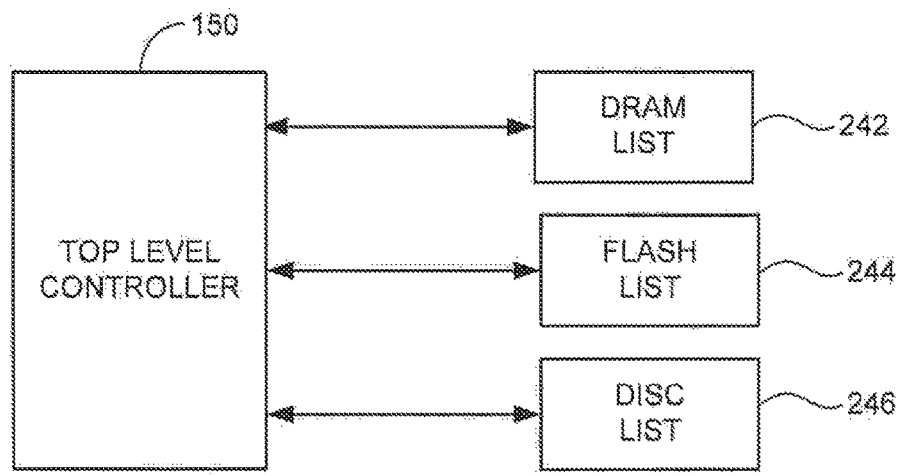
FIG. 8 illustrates various data structures maintained and used by the top level controller circuit in some embodiments.

FIG. 8 shows various data structures that may be utilized by the top level controller 150 of FIG. 4 in some embodiments. Three such data structures are shown; a DRAM list 242, a flash list 244 and a disc list 246. These data structures may take the form of a linked list or other suitable data structure to reflect the respective data sets stored in each of the respective memories (DRAM 156, flash media 130 and disc media 110). The data structures may be stored in local memory, such as the DRAM 156 or other memory accessible by the top level controller 150. The data structures may include host level logical or virtual addressing information, such as logical block addresses (LBAs), virtual block addresses (VBAs), key-block data values, etc. associated with the data. This allows the top level controller 150 to quickly and efficiently locate existing data sets and make determinations on where certain data are located to satisfy a read request, and to determine a suitable target location for the storage of input write data during a write request.

The DRAM list 242, if used, provides a listing of the contents of the respective HDD and SSD partitions of the DRAM 156. As desired, a search of the LBA fields for the entries in each can be carried out directly so that a separate DRAM list is not necessarily required. This is particularly true since read caching algorithms may not necessarily be utilized for the SSD partition of the DRAM. Similarly, the disc list 246 may not necessarily be required since all data are (nominally) ultimately written to the disc media even if initially written to flash.

Figure 9:
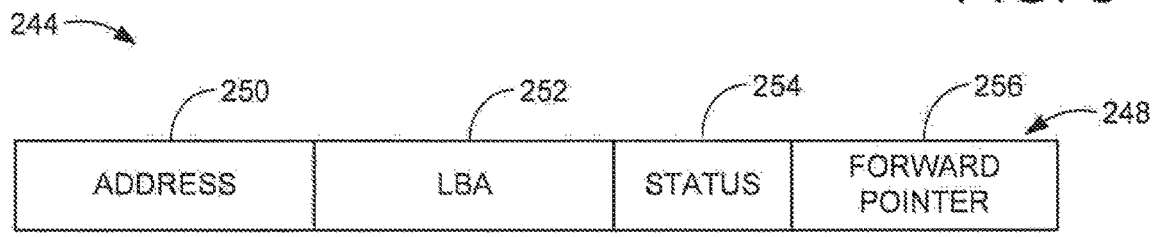
FIG. 9 is an exemplary format for the flash list data structure of FIG. 8.

An exemplary format for the flash list 244 is shown in FIG. 9. Other arrangements can be used. Generally, as discussed above one purpose of the flash list 244 is to enable the top level controller 150 to quickly and efficiently determine whether a given set of requested data are stored in the flash memory 130. Additionally, the flash list 244 also enables the top level controller 150 to construct and maintain a map structure of LBAs stored to the flash, allowing the controller 150 to make decisions with regard to whether a new set of data should be stored to flash.

The flash list 244 in FIG. 9 is made up of a number of entries 248, one of which is shown in FIG. 9. Each entry 248 may include an address field 250 indicative of the address of the data in flash, an LBA field 252 which lists one or more LBAs for the associated data block, a status field 254 which indicates the status of the data (e.g., current or stale, etc.), and a forward pointer field 256 which may be used to point to a different entry within the flash list. In this way, the flash list may be similar to metadata tracking structures utilized by the SSD channel circuit 162 in managing the data stored to the flash.

Figure 10:
FIG. 10 illustrates the arrangement of the flash list as a linked list that uses forward pointers to locate a most current version of a given data structure in the device.

The forward pointers allow the controller 150 to locate the final version of the data and confirm that the most current version remains stored in the flash memory, as generally represented in FIG. 10. In this example, three entries utilize two forward pointers to locate the most current version of data as indicated by Entry 3. The status field 254 (FIG. 9) will indicate if this set of data represents the most current version of the LBA(s) in question.

Figure 11:
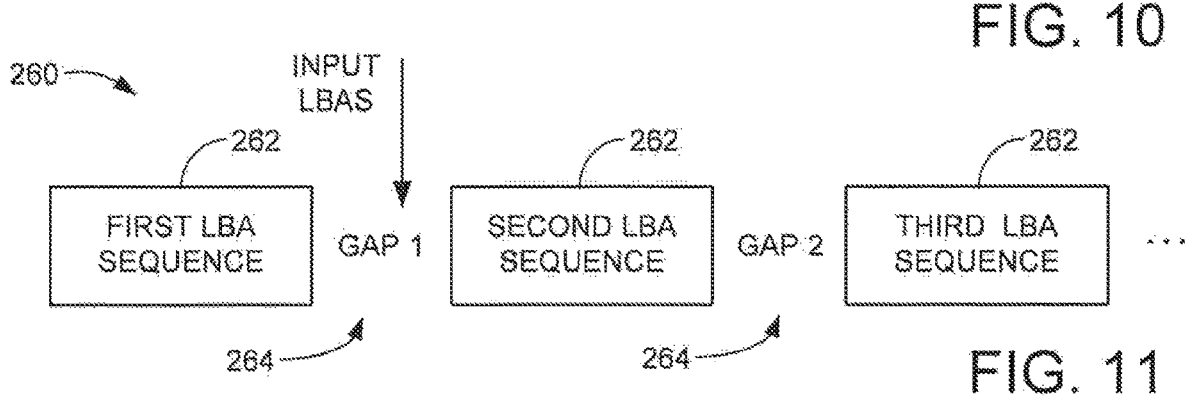
FIG. 11 shows a map structure as logical sequences of memory contents formulated by the top level controller circuit based on the data structures of FIGS. 8-10.

By sorting through the various entries in the flash list 244, a map structure 260 can be generated and maintained by the top level controller 150 in a suitable local memory, such as the DRAM 156, as represented in FIG. 11. The map structure 260 shows a logical map of LBAs stored in the flash memory. The map may be arranged as a set of contiguous sequences such as first, second and third LBA sequences 262 in FIG. 11. For example, the first LBA sequence 262 may represent LBAs from LBA 0 to X; the second LBA sequence 262 may represent LBAs from LBA X+A to B; and the third sequence 262 may represent LBAs from LBA B+C to D. Additional sequences may be provided. Gaps 264 are provided between the respective sequences.

It follows that if the most recently received version of a given LBA is currently stored in the flash memory, then the top level controller 150 may operate to store a newest version of that same LBA in the flash memory as well. Additionally, based on proximity, an LBA that is close from a logical standpoint to an existing stored LBA may also be stored. Based on the sizes of the gaps, received data may be elected to be stored in the flash based on the map structure 260. It will be appreciated that the foregoing map structures are useful during both normal mode and performance mode processing in locating existing data sets in the various memory locations as well as tracking the writing of new data sets thereto.

Figure 12:
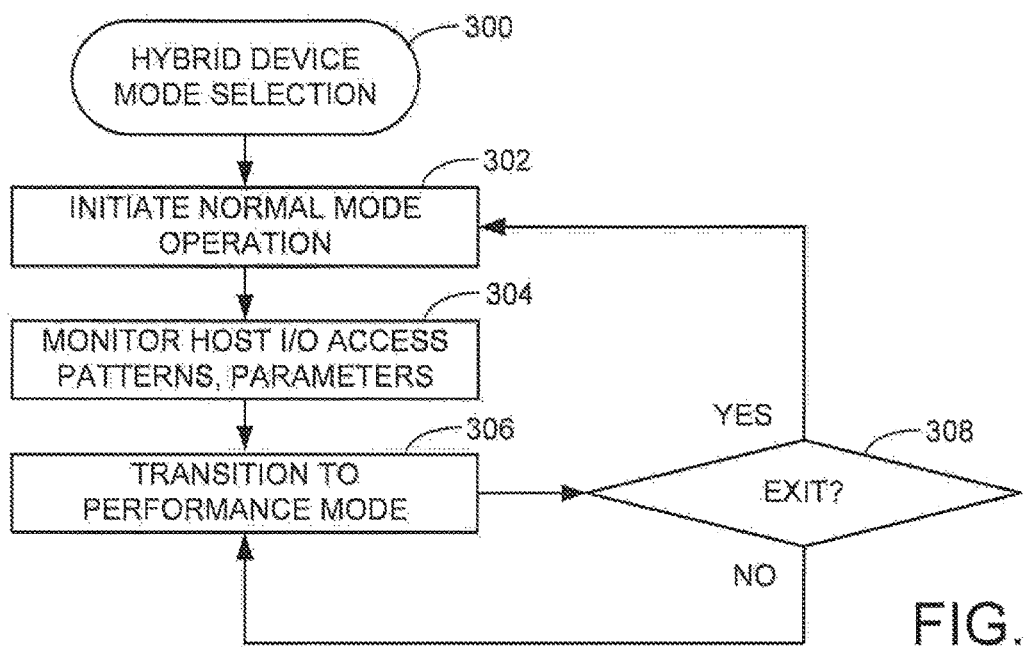
FIG. 12 is a flow chart for a hybrid device mode selection routine illustrative of steps carried out by the top level controller circuit in accordance with some embodiments.

FIG. 12 provides a hybrid device mode selection routine 300 illustrative of top level decision steps taken by the controller circuit 150. Normal operations of the device 100 is shown by step 302. Normal mode operation is the default operation of the device upon initialization, so that input data may be initially stored in either flash or disc based on various parameters discussed above. Command are processed during normal mode of operation as discussed above in FIG. 6.

The ongoing host I/O access patterns and other parameters of the system are monitored during normal mode operation, as indicated by step 304. This may include the monitoring for host generated commands to enter performance mode, a high frequency of commands involving reads and/or writes that would justify switching to performance mode, evaluation of environmental parameters (e.g., a high-shock environment where large amounts of vibration or other mechanical interference indicates a desirability to switch to performance mode), etc. In some cases, receiving commands at a data transfer rate above a predetermined threshold might be sufficient to justify switching to performance mode. Because of the additional power requirements associated with the physical HDD section (e.g., the power required to rotate the discs and operate the VCM, etc.), switching to a lower power mode in which the device nevertheless remains operational might be the basis upon which the system transitions to performance mode.

Regardless of the parameter or parameters used to justify the decision, a transition to performance mode of operation is indicated at step 306. Commands are thereafter processed in accordance with the flow diagram of FIG. 7.

Decision step 308 provides an inquiry as to whether performance mode should be exited. If not, the routine passes back to step 306, and if so, the routine passes back to step 302. Parameters that may be used to transition back to normal mode may include detection of large amounts of write data in a streaming sequence, large random I/O requests that cannot be efficiently processed by the DRAM and flash, a system reset or allocation/release of memory resources, a deactivation of the storage device, etc.

As noted above, even though the device 100 remains in performance mode, some number of disc read and write accesses may be carried out concurrently. Examples include forwarding read requests to the disc section that cannot be satisfied by the DRAM/flash, the cleaning of data written to the flash memory, the pinning of data from disc to flash, etc. Disc operation in these and other types of situations will not necessarily result in a termination of performance mode since the hierarchy of data searches and data allocations will be flash intensive during performance mode. At some point, however, it may make sense to terminate performance mode to take advantage of the deep queuing capabilities of the disc section.

For clarity, it will be understood that during performance mode the controller circuit directs all received data transfer commands exclusively to the flash memory. This may include determining, for a read command, whether the data are resident in the flash memory. Instead of declaring a read fault, however, the command is set aside for processing by the disc section.

Figure 13:
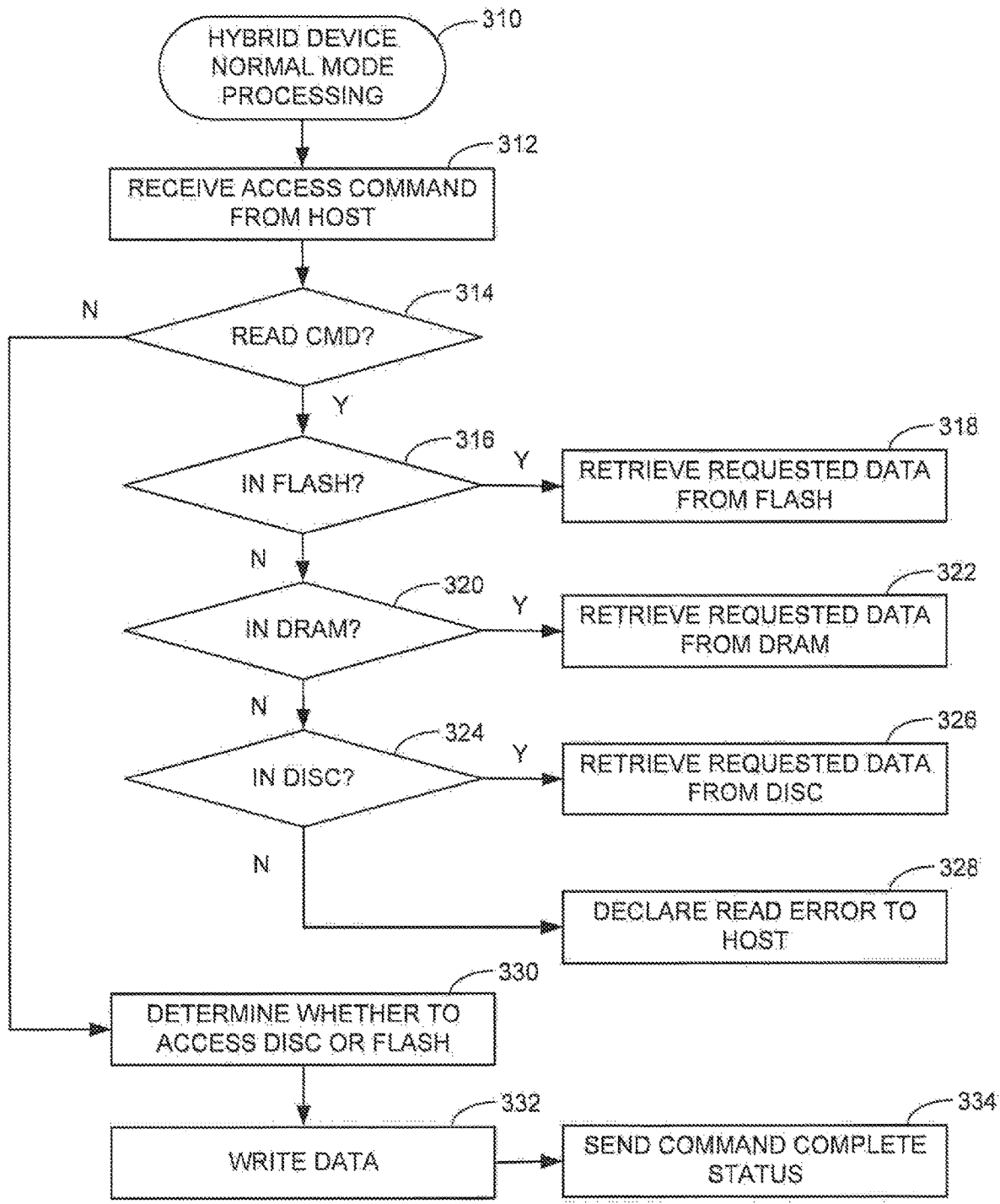
FIG. 13 is a flow chart for a hybrid device normal mode processing routine illustrative of steps carried out by the top level controller circuit in accordance with some embodiments.

FIG. 13 is a slow chart for a hybrid device normal mode processing routine 310. Various steps shown in FIG. 13 have been discussed above in FIG. 6. The routine 310 may represent programming instructions stored in local memory and executed by a programmable processor of the top level controller circuit 150. Other forms and sequences of actions may be carried out as required.

The routine commences at step 312 where an access command is received from a host device. Decision step 314 determines whether the received host access command is a read command. If so, the flow proceeds to step 316 which determines whether the requested data associated with the read command is located in the flash memory 130. As discussed above, this can be carried out including by consulting, by the top level controller 150, a table structure stored in an appropriate memory location, including but not limited to the DRAM 152, that maps the contents of the stored memory on an LBA or other logical block basis (see e.g., FIGS. 9-11).

At such time that the requested data are found to be resident in the flash memory, the flow passes to step 318 where the data are retrieved therefrom and returned to the host.

The process continues at step 320 where it is determined whether the data, if not in the flash memory, are located in the DRAM 152. More particularly, as noted above this may involve a search of the HDD partition of the DRAM since cache hits from the SSD partition are not serviced in at least some embodiments. If the data are located in the HDD partition, a cache hit is made and the data transferred, step 322.

Continuing with FIG. 13, if the data are not located in either flash or the HDD partition, the flow continues to decision step 324 where the data are determined to be in the disc, and if so, the data are retrieved at step 326. As noted above, at this point in most cases all data will be resident on the disc unless it has been written to flash and not yet cleaned (transferred), in which case the data will have already been returned from the flash. Of course, if the data are unsuccessfully retrieved from any of these locations, a read error is declared and forwarded to the host at step 328.

The respective flash and disc read transfers generally involve the forwarding of the associated read command by the top level controller 150 to the appropriate HDD or SSD command queues 154, 164 for execution by the appropriate circuitry 152, 162 to return the data to the DRAM 156 (see FIG. 4). A notification may be supplied by the HDD or SSD controller to the top level controller to enable the top level controller, in turn, to notify the host device that the data are ready. The data may be transferred automatically or the top level controller may wait for a request to transfer the data, depending on the interface protocol employed.

In such cases that the access command is a write command, the flow passes from step 314 to step 330 where the top level controller 150 determines whether to access the disc or the flash memory to satisfy the write command. The write commands are placed in the respective HDD or SSD command queues 154, 164 and the write data in the DRAM 156 are processed and written to the appropriate media. A command complete status is supplied by the top level controller at step 334.

Figure 14:
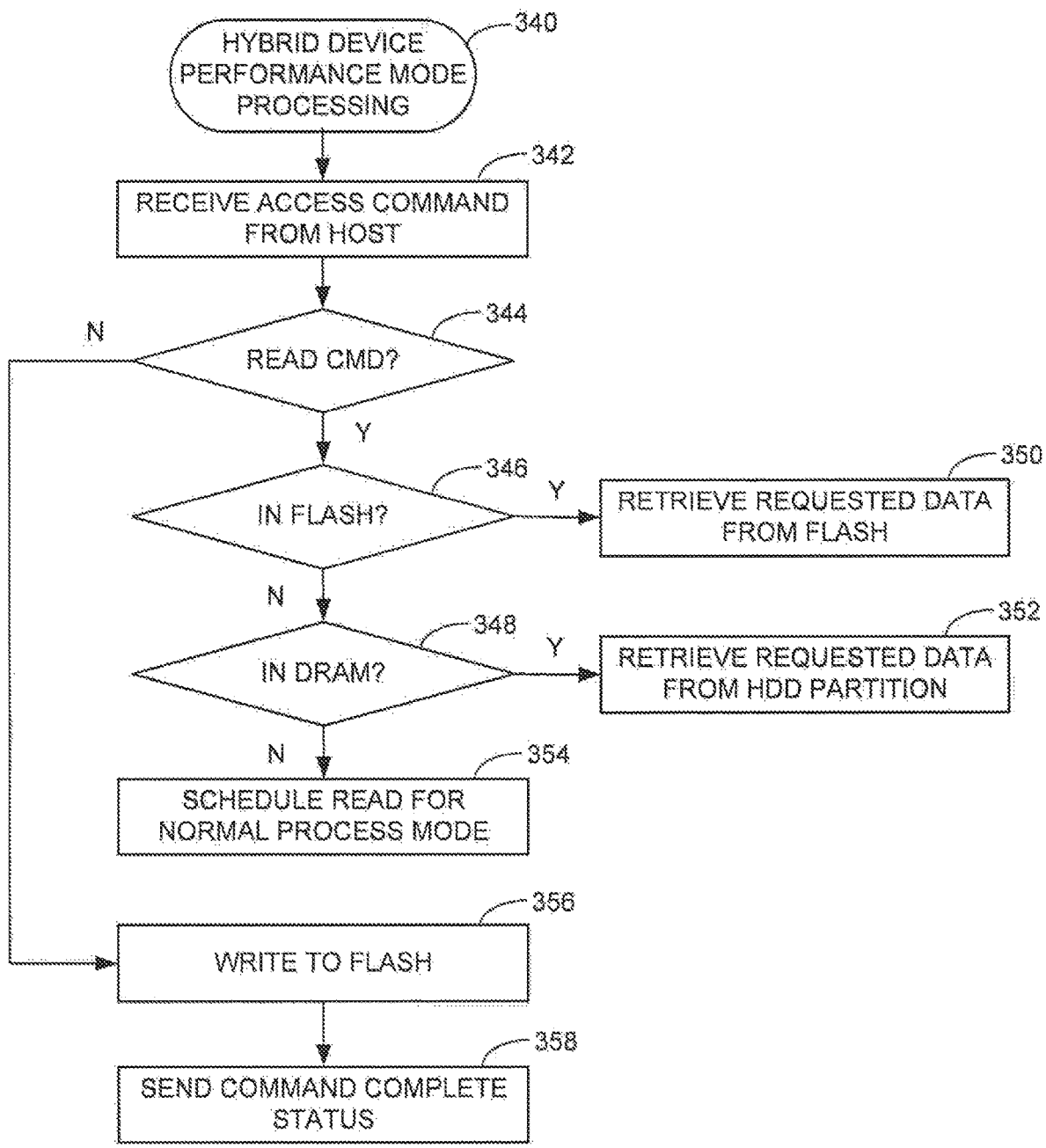
FIG. 14 is a flow chart for a hybrid device performance mode processing routine illustrative of steps carried out by the top level controller circuit in accordance with some embodiments.

FIG. 14 shows a hybrid device performance mode processing routine 340. These steps generally correspond to the discussion above of FIG. 7, and may represent programming executed by a processor circuit of the controller 150. It will be noted that some steps in FIG. 14 are similar to those from FIG. 13.

A host access command is received at step 342. If a read command, decision step 344, the controller 150 successively determines whether the data are located in flash (step 346) or DRAM (step 348). If so, the requested read data are retrieved from flash (step 350) or DRAM (step 352).

If the data are not located in the flash or DRAM, the read is scheduled for access from the disc, step 354. As discussed above this may involve transferring the disc read command to the HDD command queue and using the main path to return the data. In some cases, this will not terminate performance mode. In other cases, however, performance mode processing may be terminated at this point.

If the received command is a write command, the flow passes to step 356 where the write data are encoded and written to flash. A command complete status is thereafter sent at step 358.

With regard to read command processing during performance mode, in another embodiment, the system uses a more simplified approach; a quick check is made to see if the requested data are resident in the flash memory. If so, the read request is satisfied. If not, the command is immediately set aside for main path processing; that is, it is accumulated and processed using the main processing data path. This may include a check of the DRAM for a cache hit (on the main processing path side).

Alternatively, checks for cache hits may be omitted altogether. Stated another way, performance mode processing may disable caching and data retention algorithms in the DRAM completely. This would simplify the controller processing overhead. In some embodiments, if during performance mode processing the overhead that might be otherwise used to cache and manage the retrieved disc data in the DRAM might be better used caching that data in the flash instead. In other words, if during performance mode processing a disc access is required, the command is serviced (with the usual average lower latency for that single command), and the controller 150 immediately schedules a pinning operation to flash. While this adds to the existing flash queue, such write command can be carried out quickly. Should additional requests be issued for that read data, the data can thereafter be satisfied directly from the flash.

It is contemplated that performance mode processing can be continued substantially indefinitely during a normal I/O session. One natural limitation is that, over time, the flash memory may reach some level of capacity that approaches its overall capacity (e.g., the flash is "filled up"). Because of the relatively large amount of available flash in a hybrid device (e.g., 1-2% of overall data capacity, which may translate to 8 G, 16 G, 32 G, etc.), it is contemplated that except in extreme cases, there will be sufficiently available native flash memory available to handle normal levels of device workload.

As the remaining available flash memory capacity approaches some threshold level, accelerated cleaning of data from the flash at a higher rate can be implemented by the top level controller 150 in order to maintain some amount of available memory capacity of the flash to permit the performance mode of operation to continue. It is contemplated that this may not necessarily significantly degrade the overall data transfer performance since the disc section will be primarily operating to clean the data from the flash to the disc.

The use of a media cache structure in the disc section can help alleviate the time latencies and processor overhead necessary to complete the transfers to the discs. One such media cache is represented at 392 in FIG. 2, and comprises an outer band of tracks dedicated to receiving sequential "dumps" of write data to disc. The system can thereafter operate to migrate the data from the media cache structure to final locations on other tracks in a main store location (394) of the various disc surfaces. Such migrations can also be carried out at a reasonable rate in the background during performance mode, or can wait until the next normal mode of operation. Cache management tables (not shown) can be readily constructed and maintained to track the data that are resident in the media cache 392.

Figure 15:
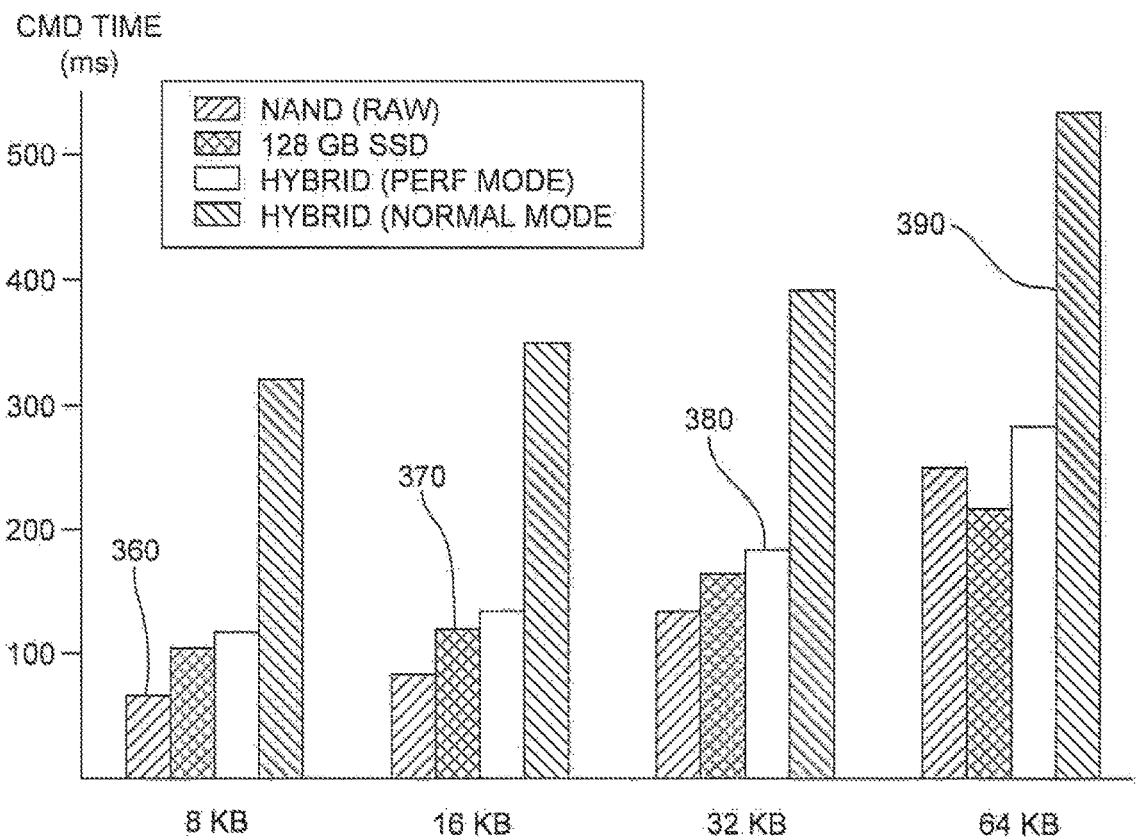
FIG. 15 is a graphical representation of performance data obtained using various configurations of data storage devices including a device constructed and operated in accordance with various embodiments of the present disclosure.

FIG. 15 provides a graphical representation or real world observed data transfer rate performance for a number of different data storage devices. The testing involved a relatively straightforward host workload of 800 random read commands for different data transfer lengths (8 KB, 16 KB, 32 KB and 64 KB).

Blocks 360 represent a data storage system having NAND flash (raw) as a baseline configuration. Blocks 370 are a commercially available SSD with a rated capacity of 128 GB of NAND flash.

Blocks 380 represent a hybrid data storage device such as 100 configured to utilize performance mode processing as discussed herein (see e.g., FIGS. 7 and 14). Blocks 390 are that same hybrid data storage device using normal (main path) processing only (see e.g., FIGS. 6 and 13).

The various blocks are arranged for the different data transfer lengths along the x-axis and overall command completion time in milliseconds to complete the command script along the y-axis.

As can be observed from FIG. 15, the raw NAND and SSD performance (blocks 360 and 370) consistently provided the shortest command completion times, as would be expected based on the semiconductor response of these configurations.

An unexpected benefit was the fact that the performance mode path (blocks 380) had completion times that were not significantly longer than the performance of blocks 360 and 370, and completion times that were significantly shorter than that same device using normal command processing (block 390). In particular, the performance mode processing (blocks 380) provided command completion times that were about 50% or less the command completion times for the normal mode processing (blocks 390). This is true even though the normal mode processing had available to it the SSD media 130.

It follows that configuring a hybrid device with a performance mode of operation as embodied herein can significantly narrow the gap in performance between an SSD and a hybrid device without altering the existing main channel path configuration.

The various embodiments presented herein have contemplated a hybrid storage device in which the main, slower memory is a rotatable media memory (e.g., rotatable magnetic recording discs) and the auxiliary, faster memory is a solid state memory (e.g., flash memory). Other embodiments can use any suitable combination of respective memories, including but not limited to applications where the slower main memory is a first form of solid state memory (e.g., erasable flash memory, etc.) and the faster auxiliary memory is a different, second form of solid state memory (e.g., rewritable STRAM, RRAM, PCRAM, PLCs, etc.). In such case, there may be a benefit to use the top level controller circuit to use the faster memory exclusively as discussed herein.

This would provide benefits consonant with those discussed above. It is noted, for example, that erasable memories such as flash memory are subjected to periodic garbage collection operations since each subsequent version of a set of data generally needs to be written to a new location, and metadata structures are usually employed to direct the system, such as via forward pointers, to the location of the latest version. Rewritable memories, on the other hand, can be overwritten with existing data and therefore may provide more efficient access, retrieval and management systems.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:

operating a hybrid data storage device comprising a local volatile cache memory, a rotatable media storage subsystem and a solid-state media storage subsystem in a normal mode of operation in which data transfer commands received from a host device are serviced by a top level controller circuit which directs a first subset of the received data transfer commands to a non-volatile rotatable recording memory of the rotatable media storage subsystem and a second subset of the received data transfer commands are directed to a non-volatile solid-state memory of the solid-state media storage subsystem, the rotatable media storage subsystem maintaining a selected average rotational latency during the normal mode, the top level controller circuit further operating during the normal mode to check the local volatile cache memory for a cache hit for read data associated with read commands in the first subset of data transfer commands prior to forwarding the first subset of data transfer commands to the rotatable media storage subsystem; and using the controller circuit to transition to a performance mode of operation responsive to a detected first parameter so that subsequently received data transfer write commands during said performance mode of operation are directed exclusively to the solid-state memory and subsequently received data transfer read commands during said performance mode of operation are directed first to the solid-state memory and second are queued to the rotatable recording memory to be fulfilled by the rotatable recording memory in the performance mode only if the received data transfer read commands cannot be fulfilled by the solid-state memory, the controller circuit configured to not check the local volatile cache memory for a cache hit for read data associated with the received data transfer read commands that cannot be fulfilled by the solid-state memory to reduce processing complexity required by the controller circuit during the performance mode, the rotatable media storage subsystem maintaining the selected average rotational latency during the performance mode.

2. The method of claim 1, wherein the detected first parameter comprises received data transfer commands at a data transfer rate above a predetermined threshold.

3. The method of claim 1, wherein during the performance mode of operation a controller circuit determines whether a requested set of host data associated with each of the respective read commands is resident in the non-volatile solid-state memory and schedules a cleaning operation during the performance mode of operation to write the requested set of host data to the rotatable recording memory.

4. The method of claim 3, wherein during the performance mode of operation the controller circuit determines a selected set of host data associated with a selected read command is not stored in the non-volatile solid-state memory, and in response the controller circuit forwards the read command to a command queue of the non-volatile rotatable memory to retrieve the selected set of host data to a local memory, followed by an immediate writing of the retrieved selected set of host data to the non-volatile solid-state memory while maintaining the hybrid data storage device in the performance mode of operation.

5. The method of claim 1, wherein during continued operation of the performance mode a controller circuit monitors a remaining available capacity of the non-volatile solid-state memory and, responsive to the remaining available capacity reaching a predetermined threshold, the controller circuit directs a cleaning operation to transfer a portion of the data written to the non-volatile solid-state memory to a media cache of the non-volatile rotatable memory.

6. The method of claim 1, wherein the first parameter comprises a detected workload sequence of input host commands issued to the hybrid data storage device by the host device.

7. The method of claim 1, wherein the first parameter comprises a measured environmental parameter from an environmental sensor comprising at least a selected one of an accelerometer or a temperature sensor.

8. The method of claim 1, wherein the second parameter is a memory reallocation command received from the host device.

9. A hybrid data storage device, comprising:

a rotatable media storage subsystem comprising a non-volatile rotatable recording memory;

a solid-state media storage subsystem comprising a non-volatile solid-state memory;

a local volatile memory arranged as a data cache; and a top level controller circuit configured to operate in a normal mode and a performance mode, the controller circuit operating during the normal mode to direct a first subset of data transfer commands received from a host device to the non-volatile rotatable recording memory and to direct a second subset of the received data transfer commands are directed to a non-volatile solid-state memory, the controller circuit operating during the performance mode to direct all data transfer write commands received from the host device to the non-volatile solid-state memory and to direct all data transfer read commands first to the solid-state memory and second to the rotatable recording memory to be fulfilled by the rotatable recording memory in the performance mode only if the received data transfer read commands cannot be fulfilled by the solid-state memory, the controller circuit transitioning from the normal mode to the performance mode responsive to a detected first parameter, the controller circuit subsequently transitioning from the performance mode back to the normal mode responsive to a detected second parameter, the controller circuit further operating during the normal mode to check the local volatile memory for a cache hit for read data associated with read commands in the first subset of data transfer commands prior to forwarding the first subset of data transfer commands for servicing by the rotatable media storage subsystem, the controller circuit further operating during the performance mode to bypass the local volatile memory and retrieve read data associated with the received data transfer read commands that cannot be fulfilled by the solid-state memory to reduce processing complexity required by the controller circuit during the performance mode.

10. The hybrid data storage device of claim 9, further comprising a volatile local memory managed as a cache memory by the top level controller circuit to temporarily store sets of user data during transfer operations between the host device, the non-volatile rotatable recording memory, and the non-volatile solid-state memory and wherein the subsequently received data transfer read commands during said performance mode of operation are directed to the volatile local memory if the received data transfer read commands cannot be fulfilled by the solid state memory before being directed to the rotatable recording memory.

11. The hybrid data storage device of claim 10, wherein the controller circuit maintains the non-volatile rotatable recording memory at a nominal selected number of revolutions per minute (RPM) during the normal mode, and wherein the controller circuit further maintains the non-volatile rotatable recording memory at the nominal selected number of RPMs during the performance mode.

12. The hybrid data storage device of claim 9, wherein the first parameter comprises the received data transfer commands at a data transfer rate above a predetermined threshold.

13. The hybrid data storage device of claim 9, wherein the second parameter the received data transfer commands comprise a large amount of write data in a streaming sequence.

14. The hybrid data storage device of claim 13, wherein during the performance mode of operation the controller circuit determines a selected set of host data associated with a selected read command is not stored in the non-volatile solid-state memory, and in response the controller circuit forwards the read command to a command queue of the non-volatile rotatable memory to retrieve the selected set of host data to a local memory, followed by an immediate writing of the retrieved selected set of host data to the non-volatile solid-state memory while maintaining the hybrid data storage device in the performance mode of operation.

15. The hybrid data storage device of claim 9, wherein during continued operation of the performance mode the controller circuit monitors a remaining available capacity of the non-volatile solid-state memory and, responsive to the remaining available capacity reaching a predetermined threshold, the controller circuit directs a cleaning operation to transfer a portion of the data written to the non-volatile solid-state memory to a media cache of the non-volatile rotatable memory.

16. The hybrid data storage device of claim 9, wherein the hybrid data storage device is characterized as a hybrid solid state device (HSSD) so that the non-volatile rotatable memory comprises at least one rotatable magnetic recording disc, and the non-volatile solid-state memory comprises a NAND flash memory.

17. The hybrid data storage device of claim 9, wherein the top level controller circuit comprises a programmable processor with associated programming in a local memory to direct data transfers during both the normal mode of operation and the performance mode of operation to both the solid-state memory and the rotatable recording memory.

18. A hybrid data storage device, comprising:

a rotatable data recording disc configured to provide a main non-volatile memory (NVM);

a flash memory configured to provide an auxiliary NVM;

a volatile cache memory configured to temporarily store user data during transfers between a host device and the respective main and auxiliary NVMs; and a top level controller circuit configured to operate in respective normal and performance modes, the normal mode including the top level controller circuit operating to check the volatile cache memory for cache hits responsive to read commands from the host device, the performance mode including the top level controller circuit operating to bypass the volatile cache memory for cache hits and, for data sets read from the main NVM and transferred to the volatile cache memory for subsequent transfer to the host device, further operating to transfer the data sets from the volatile cache memory to the auxiliary NVM.

19. The hybrid data storage device of claim 18, wherein the top level controller circuit transitions from the normal mode to the performance mode responsive to detection of a first operational parameter associated with the hybrid data storage device, and wherein the top level controller subsequently transitions from the performance mode back to the normal mode responsive to detection of a different, second operational parameter associated with the hybrid data storage device.

20. The hybrid data storage device of claim 18, wherein during the normal mode the top level controller checks the volatile cache memory for cache hits for data sets requested by read commands that cannot be satisfied using the auxiliary NVM, and wherein during the normal mode the top level controller does not check the volatile cache memory for cache hits for data sets requested by read commands that can be satisfied using the auxiliary NVM.

* * * * *